United States Patent
Guillotel et al.

(10) Patent No.: US 11,184,581 B2
(45) Date of Patent: Nov. 23, 2021

(54) METHOD AND APPARATUS FOR CREATING, DISTRIBUTING AND DYNAMICALLY REPRODUCING ROOM ILLUMINATION EFFECTS

(71) Applicant: INTERDIGITAL CE PATENT HOLDINGS, Paris (FR)

(72) Inventors: Philippe Guillotel, Cesson-Sevigne (FR); Martin Alain, Cesson-Sevigne (FR); Erik Reinhard, Cesson-Sevigne (FR); Jean Begaint, Cesson-Sevigne (FR); Dominique Thoreau, Cesson-Sevigne (FR); Joaquin Zepeda Salvatierra, Cesson-Sevigne (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 122 days.

(21) Appl. No.: 16/464,419

(22) PCT Filed: Nov. 28, 2017

(86) PCT No.: PCT/EP2017/080626
§ 371 (c)(1),
(2) Date: May 28, 2019

(87) PCT Pub. No.: WO2018/099898
PCT Pub. Date: Jun. 7, 2018

(65) Prior Publication Data
US 2020/0382742 A1     Dec. 3, 2020

(30) Foreign Application Priority Data

Nov. 30, 2016    (EP) .................................... 16306579

(51) Int. Cl.
*H04N 5/04*     (2006.01)
*H04N 7/025*    (2006.01)
(Continued)

(52) U.S. Cl.
CPC ............. *H04N 7/025* (2013.01); *A63F 13/52* (2014.09); *A63F 13/537* (2014.09); *H04N 5/04* (2013.01); *H05B 47/155* (2020.01)

(58) Field of Classification Search
CPC .......... H04N 5/04; H04N 5/222; H04N 7/025; H04N 9/68; H05B 47/155; A63F 13/52;
(Continued)

(56) References Cited

U.S. PATENT DOCUMENTS 8,467,001 B2    6/2013  Chen et al.
8,970,786 B2    3/2015  Li et al.
(Continued)

FOREIGN PATENT DOCUMENTS

CN    103795896    5/2014
EP    2914067      9/2015

*Primary Examiner* — Sherrie Hsia
(74) *Attorney, Agent, or Firm* — Patricia A. Verlangieri (57) ABSTRACT

A content stream comprising video and synchronized illumination data is based on a reference lighting setup from, for example, the site of the content creation. The content stream is received at a user location where the illumination data controls user lighting that is synchronized with the video data, so that when the video data is displayed the user's lighting is in synchronization with the video. In one embodiment, the illumination data is also synchronized with events of a game, so that a user playing games in a gaming environment will have his lighting synchronized with video and events of the game. In another embodiment, the content stream is embedded on a disk.

12 Claims, 9 Drawing Sheets

(51) Int. Cl.
*A63F 13/52* (2014.01)
*A63F 13/537* (2014.01)
*H05B 47/155* (2020.01)

(58) Field of Classification Search
CPC ............... A63F 13/537; G09G 3/3406; G02F 1/133604; G02F 1/133603; G02F 1/133602
USPC ....... 348/460, 464, 500, 510, 520, 519, 602, 348/603, 722; 345/102; 362/97.1, 97.2
See application file for complete search history.

(56) References Cited

U.S. PATENT DOCUMENTS

| | | |
|---|---|---|
| 9,084,312 B2 | 7/2015 | Cook |
| 9,432,612 B2 | 8/2016 | Bruhn et al. |
| 10,772,177 B2 * | 9/2020 | Mason ............... G06F 3/04847 |
| 2009/0109340 A1 | 4/2009 | Iwanami et al. |
| 2010/0031298 A1 | 2/2010 | Iwanami et al. |
| 2010/0177247 A1 | 7/2010 | Sekulovski et al. |
| 2013/0088644 A1 | 4/2013 | Atkins |
| 2015/0117830 A1 | 4/2015 | Faaborg |
| 2015/0305117 A1 | 10/2015 | Van Herpen |
| 2016/0366444 A1 | 12/2016 | Sullivan |
| 2017/0034519 A1 | 2/2017 | Rosewarne |
| 2017/0238062 A1 | 8/2017 | Oh et al. |

* cited by examiner

| Nb of lights = Setup n° | Position (in a square room) | Codeword order | |
|---|---|---|---|
| 1 | Center Front : 1 | $Light_1$ | |
| 2 | Center Front : 1<br>Center Back : 2 | $Light_1, Light_2$ | |
| 3 | Center Front : 1<br>right Back : 2<br>left Back : 3 | $Light_1, Light_2, Light_3$ | |
| 5 | Center Front : 1<br>right : 2<br>right Back : 3<br>left Back : 4<br>left : 5 | $Light_1, Light_2, Light_3$<br>$Light_4, Light_5$ | |
| ... | ... | ... | ... |

METHOD AND APPARATUS FOR CREATING, DISTRIBUTING AND DYNAMICALLY REPRODUCING ROOM ILLUMINATION EFFECTS

FIELD OF THE INVENTION

The present principles relate to the specification of a format and system for color illumination creation, distribution and rendering, synchronized with audio/video content.

BACKGROUND OF THE INVENTION

Consumers generally watch television or movies, or play games at home in a viewing environment that is not well controlled. The viewing environment, the room where the consumer and the display are located, is typically illuminated by daylight and/or a combination of tungsten, fluorescent and LED light sources. This leads to a great variability of viewing environments, none of which are ideal for viewing content.

Human visual perception strongly depends on how it adapts to its environment. The perception of content seen on a television, for instance, therefore depends strongly on how the room is illuminated. As a consequence, while directors of photography have control over the content that they distribute, they do not have control over how this content is perceived. Replicating the viewing conditions of the grading studio would help solve this problem, either by designing a room to match the grading studio, or by communicating static lighting.

SUMMARY OF THE INVENTION

These and other drawbacks and disadvantages of the prior art are addressed by at least one of the described embodiments, which are directed to a method and apparatus for creating, distributing and dynamically reproducing room illumination effects.

According to a general aspect described herein, there is provided a method, comprising: receiving a content stream comprising video and illumination data, wherein said illumination data comprises luminance and chrominance information synchronized to said video data and based on a reference lighting setup; providing said illumination data to control lighting at location of a receiver by mapping the illumination data to the lights at said receiver location; and outputting the video data for display in synchronization with lighting at the receiver location.

According to another general aspect described herein, there is provided an apparatus. The apparatus comprises a receiver of a content stream comprising video and illumination data, wherein said illumination data comprises luminance and chrominance information synchronized to said video data and based on a reference lighting setup, and a lighting controller to control lights at location of said receiver by mapping the illumination data to lighting at said receiver location in synchronization with the video data that is output for display.

According to another general aspect described herein, there is provided another method. The method comprises generating illumination data comprising luminance and chrominance information from lighting controls based on a reference lighting setup, and providing a content stream comprising video data and said illumination data, wherein said illumination data comprises luminance and chrominance information synchronized to said video data and based on a reference lighting setup.

According to another general aspect described herein, there is provided an apparatus. The apparatus comprises a controller to generate illumination data comprising luminance and chrominance information from lighting controls based on a reference lighting setup, and a processor to provide a content stream comprising video data and said illumination data, wherein said illumination data comprises luminance and chrominance information synchronized to the video data.

These and other aspects, features and advantages of the present principles will become apparent from the following detailed description of exemplary embodiments, which is to be read in connection with the accompanying drawings.

DETAILED DESCRIPTION

An approach is described for creating room illumination effects based on a defined reference setup, encoding those effects using metadata and rendering this information using a user illumination setup in a home, movie theater, or other environment.

Room illumination may additionally be used creatively to increase the level of immersion. Generally lighting effects are extracted at the receiver side from the content using some computer vision tools. The PHILIPS Ambilight TV set is an example of such technology currently on the market. It illuminates a small wall area behind the television with colored light derived from the content displayed simultaneously. Projectors may also be used to project on walls and objects surrounding the television, as demonstrated by Microsoft's IllumiRoom. An alternative system analyzes the video footage to drive external lights that are placed in strategic places in the room.

Another approach describes a system for capturing illumination in one room, and reproducing it using programmable light sources in a different room.

The ISO/IEC 23005 standard (aka MPEG-V) proposed a format to represent and transmit Media Context and Control information. It typically includes means to represent and encode lighting information. However it does not specify the workflow to create and render those effects and to use this format. The MPEG-V format itself is based on XML (Extensible Markup Language) and is quite complex since it was done to be generic and apply to any type of system. In addition it is not said how to "map" the created effects to the rendering setup.

None of the aforementioned systems and solutions allow directors of photography to exert creative/dynamic control over the consumers' viewing environments, and thereby actively enhance the viewer's immersive experience. A key difference from existing solutions is that the embodiments herein described allow remote authoring of dynamic room illumination, synchronize this information with A/V (audio/video) content, and reproduce the authored room illumination along with A/V playback in a consumer's home. Similar principles can also apply to creating light effects associated with games. One difference is the interactivity with gaming. Thus the special effects are created during the game design depending on actions and places, and the gaming receiver plays back the effects when appropriate during the game. This can be in response to something a player does, a score value, or a situation or event that occurs in the game, for example.

The described embodiments attempt to solve all these issues with the specification of a reference setup, the specification of a simple metadata format to transmit the light effects information, an associated coding scheme to be synchronized with A/V streams, and the specification of an approach to "map/translate/adapt" the created effects to the user setup.

To this end, an example embodiment of one workflow is assumed as follows.

Figure 1:
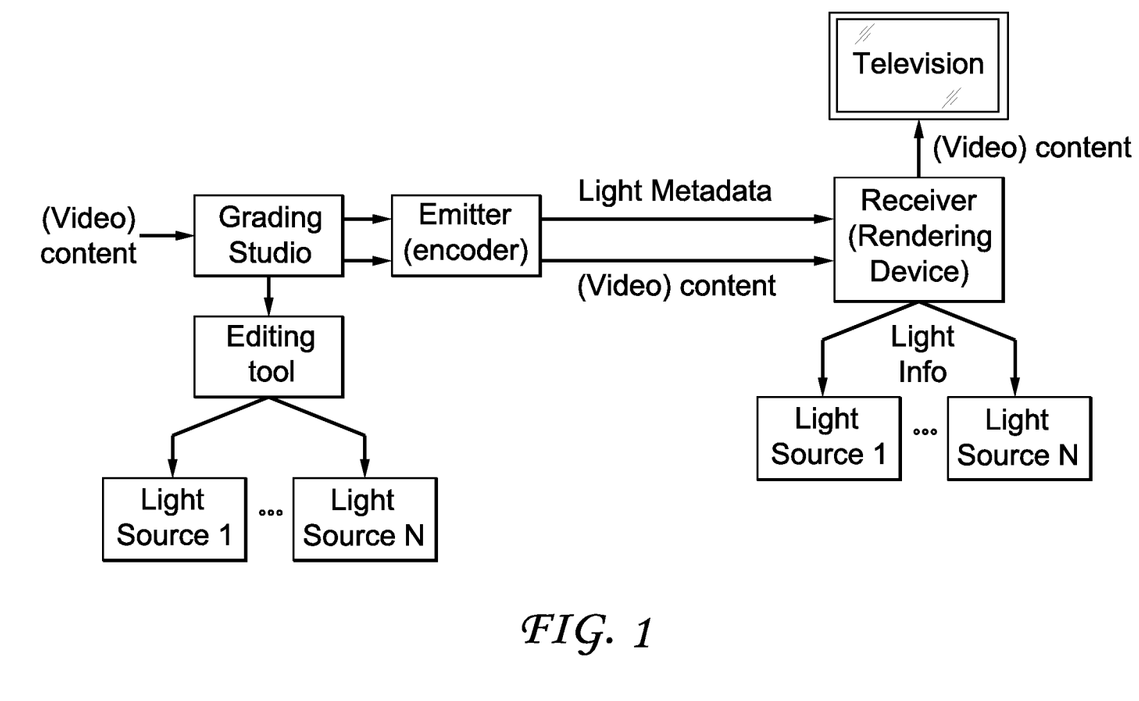
FIG. 1 shows one example of the light effect rendered by receiver lights.
Figure 2:
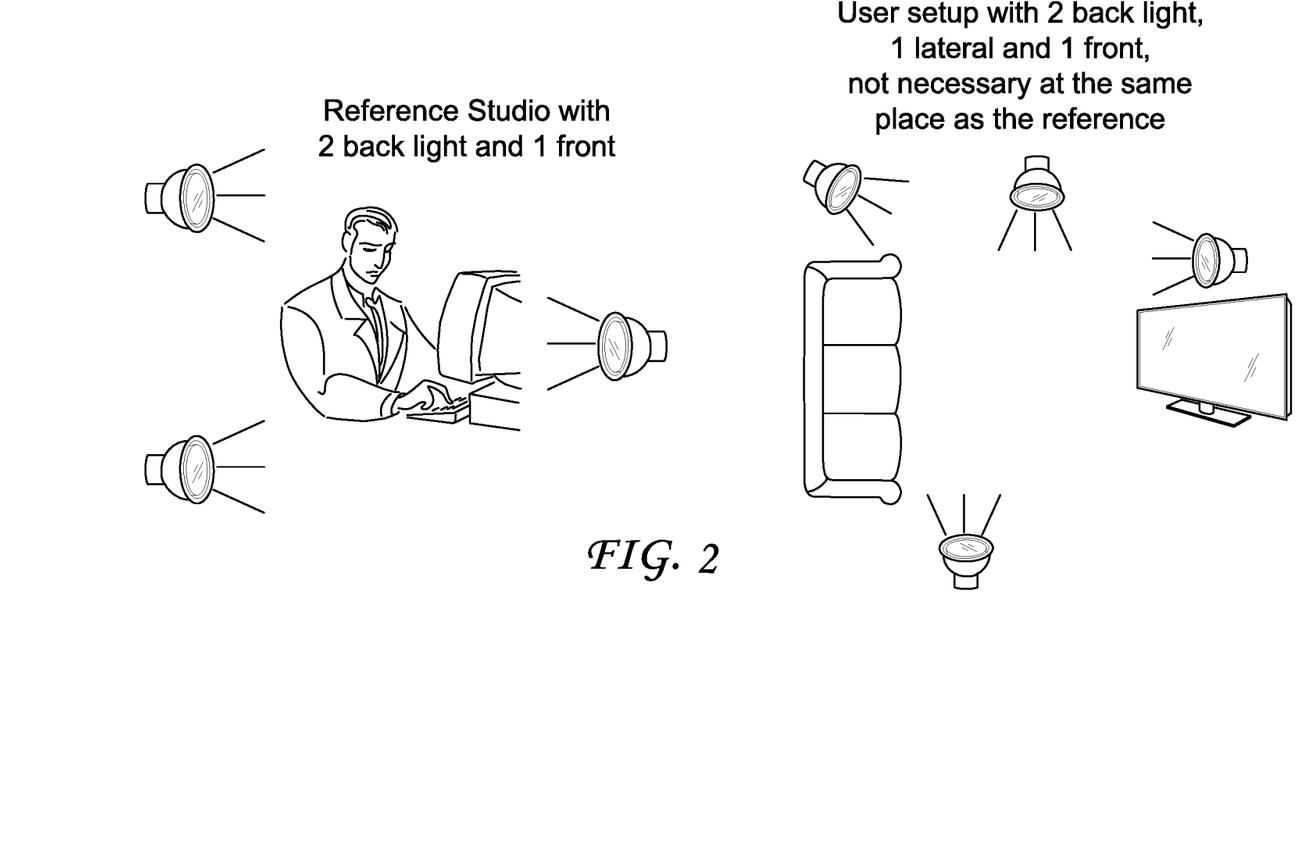
FIG. 2 shows an example of creation setup and the receiver setup that can be different.
Figure 3:
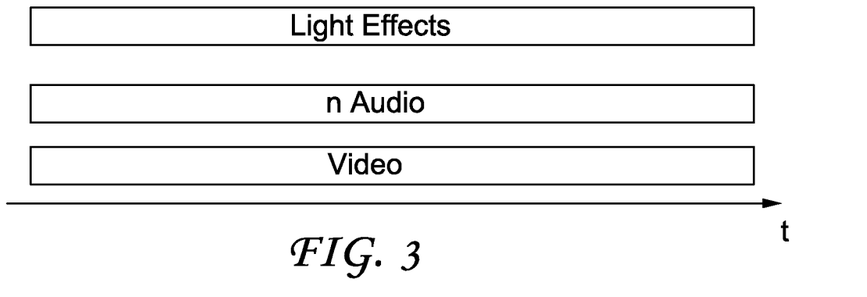
FIG. 3 shows one embodiment of the created metadata transmitted to a receiver together with the A/V streams in a multiplex.
Figure 7:
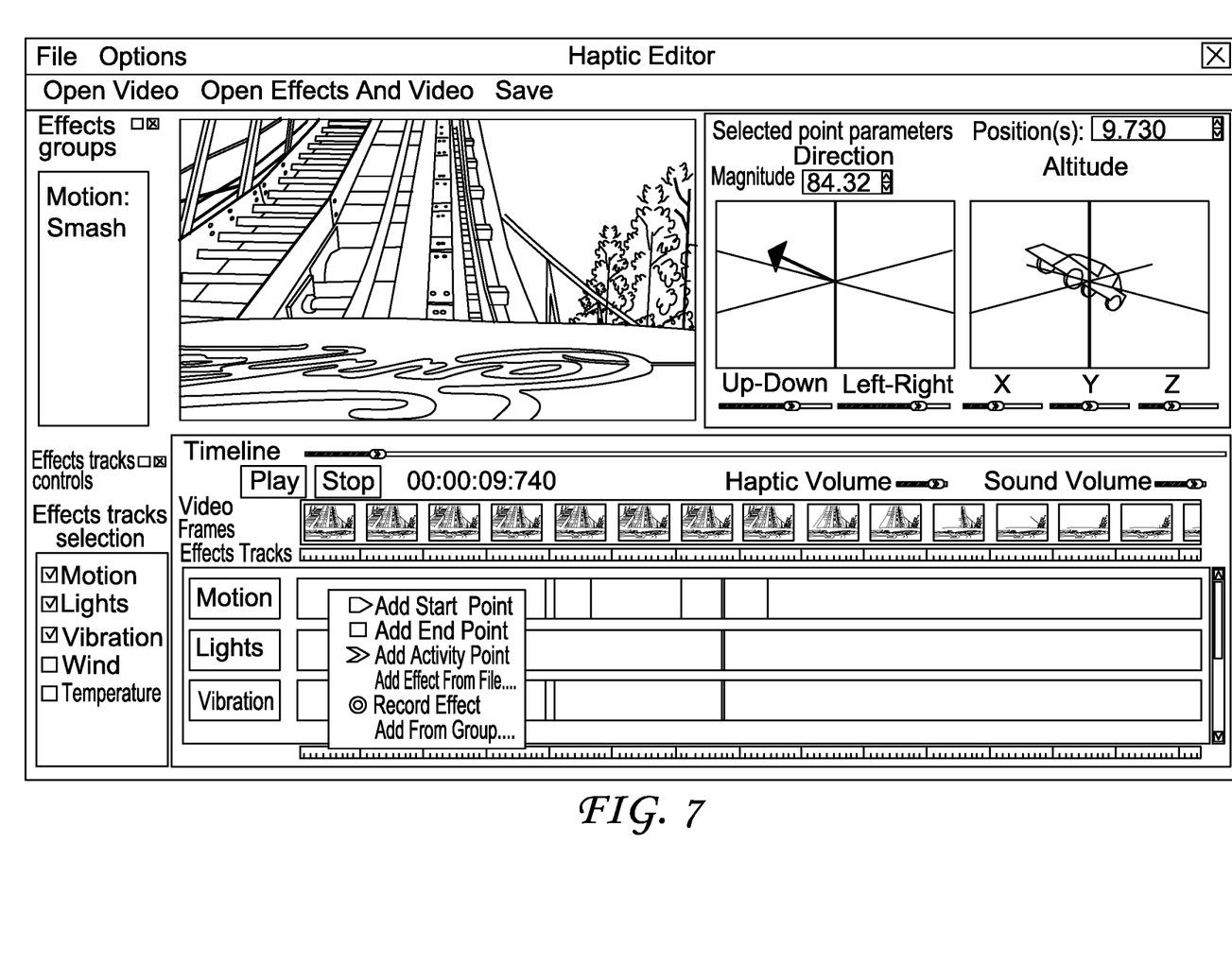
FIG. 7 shows an example of an editing tool to create lighting effects synchronized with audio/video content.

The post-production studio is fitted with lights for which the emission characteristics and position are known. The effects are created using a dedicated editing tool, an example as shown in FIG. 7. Then the created metadata can be transmitted to a receiver together with the A/V streams in the appropriate multiplex, an example as shown in FIG. 3. The metadata are then decoded by the receivers, some adaptation is performed if necessary, and the light effect is rendered by the receiver lights, an example as shown in FIG. 1. The creation setup and the receiver setup can be different, an example as shown in FIG. 2.

The same concept can be included into gaming design platform and editing tools. The created data are then included into the gaming representation format as additional information. As an example, assuming a representation format similar to XML, dedicated messages are created, as described below, and played back by the gaming platform.

The emission characteristics of the light sources are summarized into a straightforward descriptor, such as luminance L along with a and b chromaticity coordinates (i.e. a single tristimulus value in the CIELab color space). Alternatively, they can be encoded in various other formats, such as RGB for example.

Figure 4:
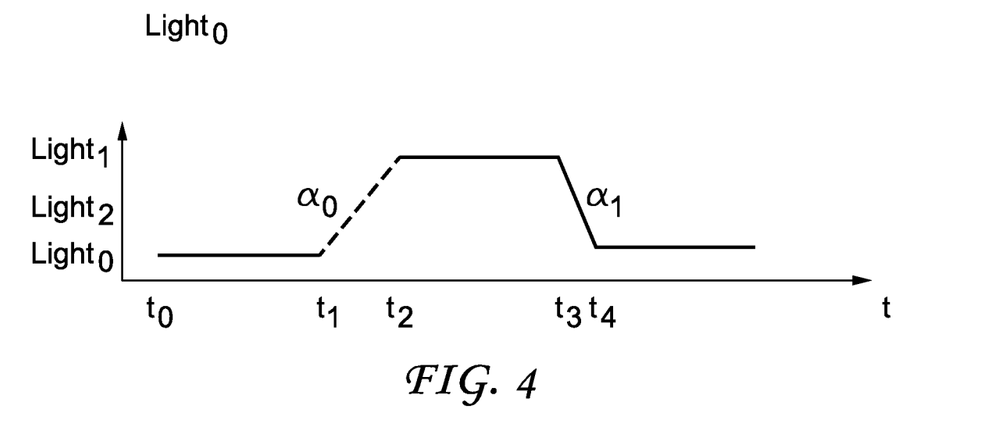
FIG. 4 shows an example of specification of a light effect, comprising a color with duration and speed.
Figure 5:
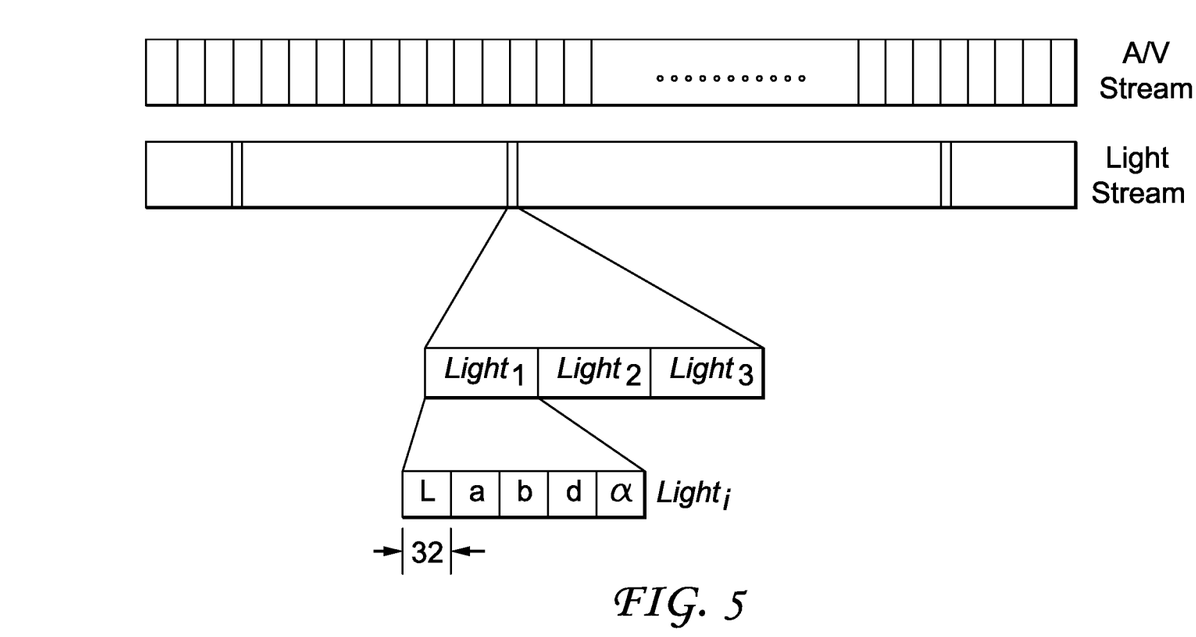
FIG. 5 shows an example configuration of a codeword describing illumination effects.

The Light$_i$ effect is created using an editing tool to add, at a given time during a particular media content, such as a movie, show, or cartoon, for example. The light effect can comprise a color with its duration and speed, for example, an example as shown in FIG. 4. The synchronization is assumed by a network layer (for example IP, MPEG-2 TS, mp4 file . . . . ) that includes appropriate timestamps to the A/V/L (audio/video/light) data packets, an example as shown in FIG. 3. The codeword, an example as shown in FIG. 5, can have a configuration, for example, of:

1) three 32 bit fields of information for the color information Lab
2) A 32 float field for the duration d of light
3) A 32 float field for parameters a describing the speed to move from one light level to another one. This can be defined as a linear function, and in terms of seconds, for example.

The Light$_i$ effect is created using an editing tool to add, at a given action and place during the game, a color with its duration and speed, an example as shown in FIG. 4. The synchronization is assumed by the game engine renderer. The XML message can be, without loss of generality, for example:

```
<ligheffects ID=01>
    <color>{rgb , 0.2,0.1,0.8}</color>
    <duration>10.3</duration>
    <speed>0.5</speed>
</lighteffects>
```

Figure 6:
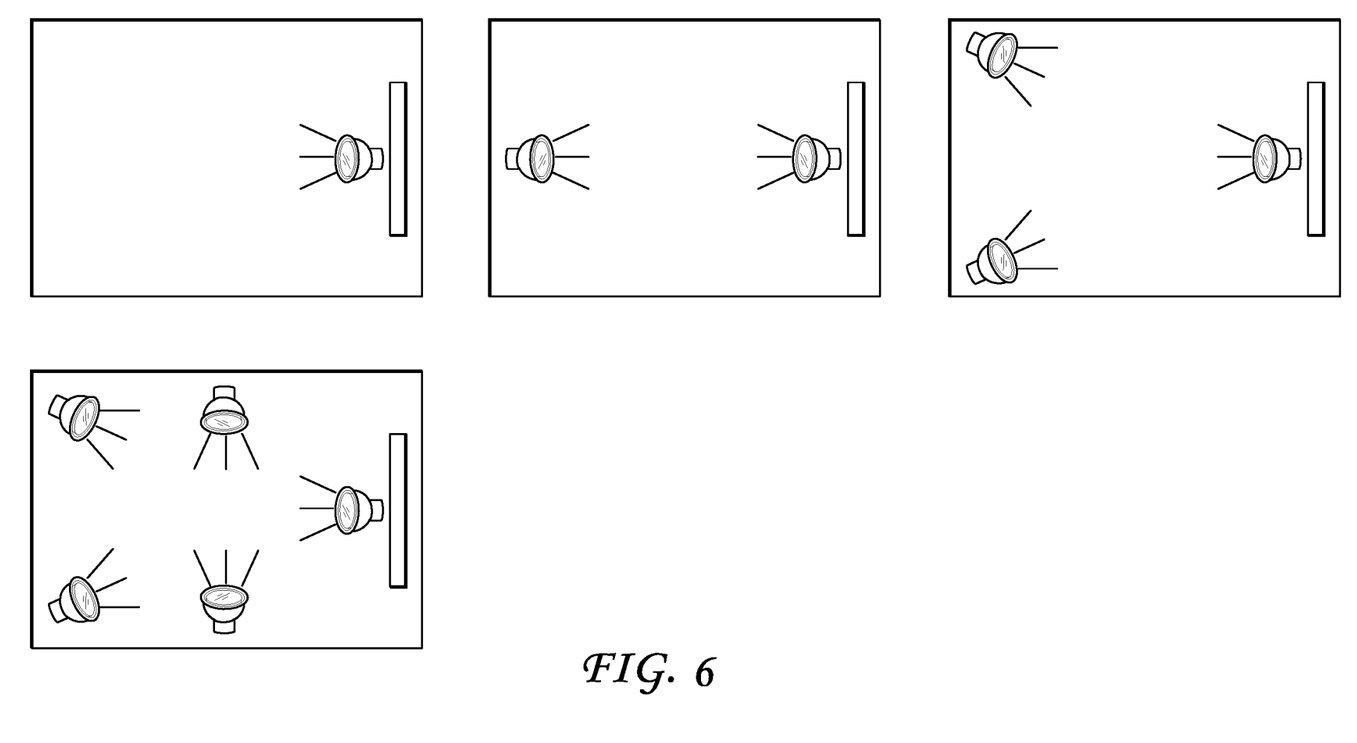
FIG. 6 shows several example configurations of light placement in a room.
Figure 8:
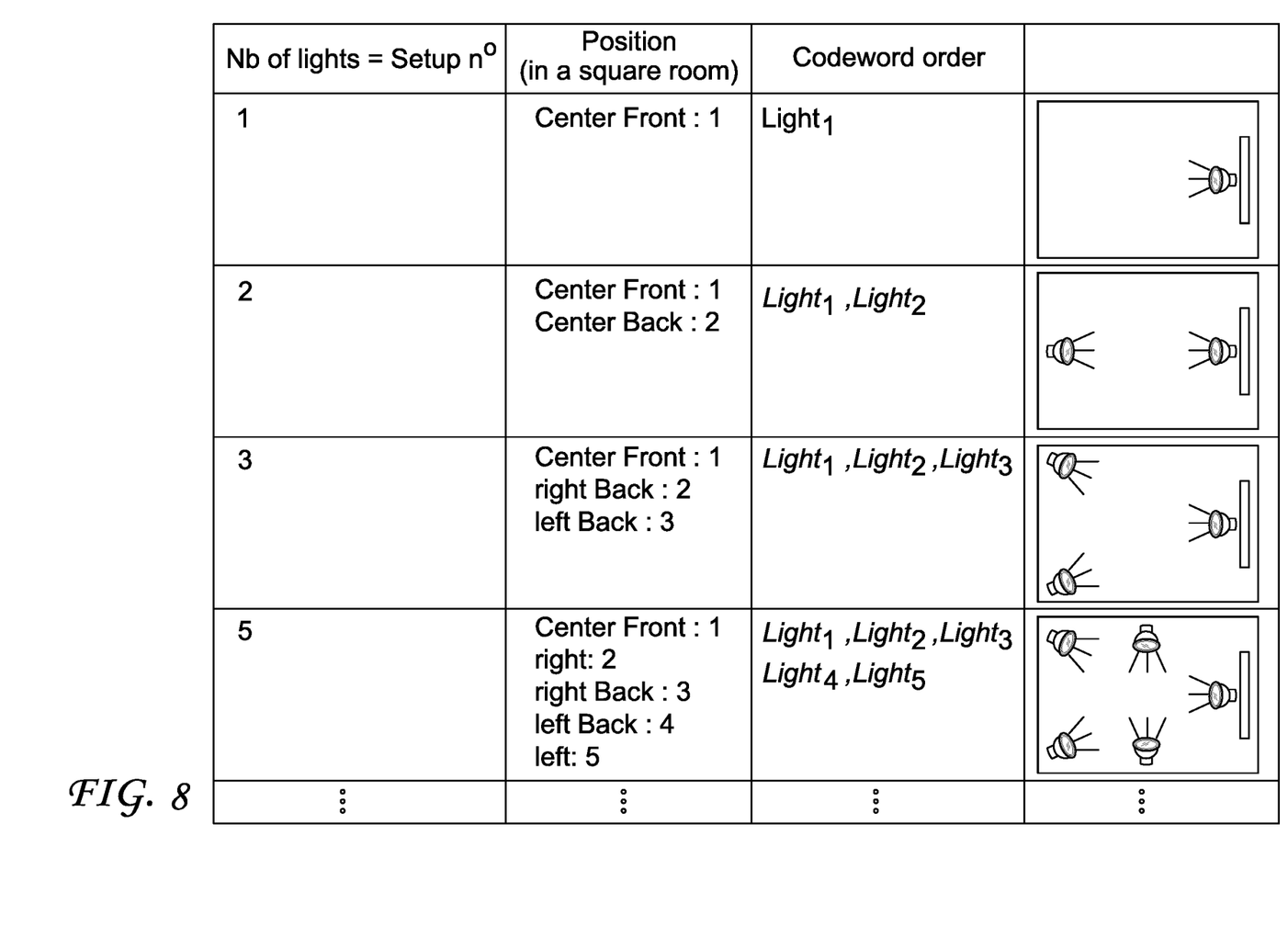
FIG. 8 shows an example of a simple mapping of a lighting configuration.

FIG. 6 shows several example configurations of light placement in a room. If multiple light sources are used in the studio, then their number and position in a squared room can be transmitted. Alternatively, the simple mapping shown in FIG. 8 can be used, for example. Clockwise order is assumed in this example, starting from front center and looking to front.

The consumer device which receives the content, which could be a television, a set-top box, a DVD player, a Blu-Ray player, an OTT (over the top) device, a game platform, or any other device capable of receiving and playing content, will extract the Light metadata values and control the receiver's lights accordingly.

In case the setup of the viewer is different from the reference studio, then some adaptation is required. For example, to go from fewer lights to more, a simple duplication can be used to the closest light. If setup number 3 is used for the creation and the receiver has setup number 5, the light effect number 2 of the emitter is copied to number 2 and number 3 of the receiver, and light effect number 3 of the emitter is copied to number 4 and number 5 of the receiver. Or, the lighting effects for the additional lights can be a function of the lighting parameters from the reference lighting locations. Other variations are possible.

Or, in the case in which one goes from more lights to fewer, or if the localization of the light sources are not the same as the studio ones, a simple average can be used or more complicated color mapping depending on distance and dominant color. The lighting effects for the viewer lights can be a function of the lighting parameters from the reference lighting locations. Other variations are again possible.

One advantage of at least one of the embodiments is that it enables the director of photography to create special light effects for the viewing environment of the end consumer, for the purpose of enhancing the viewing experience. The proposed embodiments specify a full workflow to create, transmit and render those lighting effects, simple and compatible with existing infrastructures and A/V data streams.

Devices capable of controlling light sources in a home using metadata synchronized with A/V content can use the described embodiments. For gaming, dedicated light codes can be added into the game description language.

At least one described embodiment proposes to create, distribute and render illumination effects created by movie directors during film creation of post-production. The final goal being to increase the immersion for the final viewer. The illumination in the grading studio can be characterized by the color of several light sources together with their number and assumed position in the viewing room. The color of the light source can be encoded as metadata synchronized with the A/V stream in any transmission (broadcast, OTT, etc.), and could also be embedded on DVDs and Blu-Ray disks. The ISO/IEC 23005 standard (aka MPEG-V) can be used to describe such data, but we propose a simplified format inspired by audio multi-channel schemes. The recipient (or player) would receive these values, optionally perform some adaptation to fit with the consumer setup (compared to the reference one), and then dynamically control lights/projectors through the consumers' home WIFI, or through any other protocol used to interact with connected lights/projectors to render the light effects.

Figure 9:
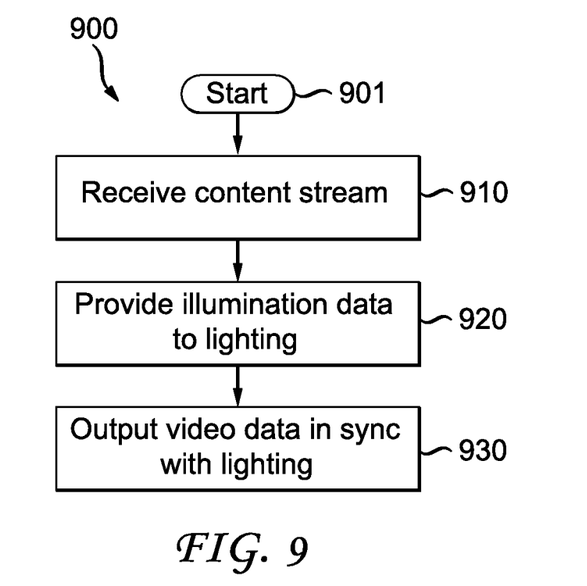
FIG. 9 shows an example embodiment of a method for receiving a content stream to control lighting at a user location.

One embodiment of the ideas herein described is illustrated in FIG. 9. FIG. 9 shows one embodiment of a method 900 for using embedded information to control lights at a user location. The method commences at Start block 901 and control proceeds to block 910 for receiving a content stream. Control proceeds from block 910 to block 920 for providing illumination data to lighting at the user location. Control then proceeds to block 930 for outputting video data in synchronization with the controlled lighting. It should also be understood that the steps for providing illumination data to the lighting and for outputting video data can be performed in parallel, although shown sequentially in FIG. 9. Block 910 can also comprise demultiplexing to separate the illumination data from the video data, and from any other type of data comprising the content stream. Block 920 can also comprise mapping, if necessary, to map the illumination data that is based on a reference lighting setup, typically at the site of a content creator, to the lighting at a user location.

Figure 10:
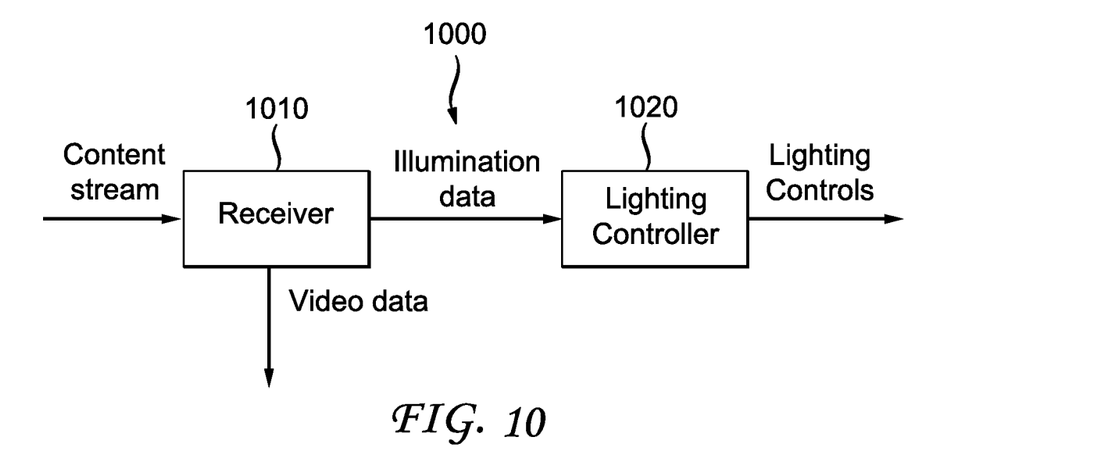
FIG. 10 shows an example embodiment of an apparatus for receiving a content stream to control lighting at a user location.

Another embodiment of the described ideas is illustrated in FIG. 10 which shows an apparatus 1000 for using embedded information to control lights at a user location. The apparatus comprises a Receiver 1010 of a content stream comprising video and illumination data. The illumination data output of Receiver 1010 is in signal connectivity with an input of Lighting Controller 1020. Another output of Receiver 1010 is video data information that is typically sent to a display (not shown). Lighting Controller 1020 outputs lighting controls on an output port. Receiver 1010 can also comprise a demultiplexer for separating the illumination data from the video data, and from any other type of data comprising the content stream. Lighting Controller 1020 can also perform mapping, if necessary, to map the illumination data that is based on a reference lighting setup, typically at the site of a content creator, to the lighting at a user location.

Figure 11:
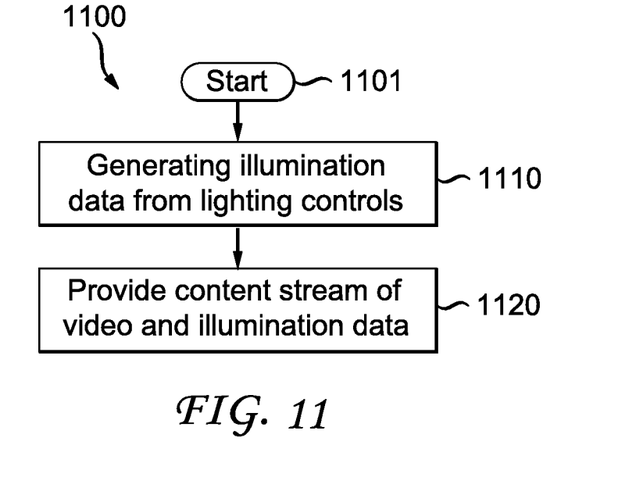
FIG. 11 shows an example embodiment of a method for generating a content stream to control lighting at a user location.

Another embodiment of the described ideas is illustrated in FIG. 11 which shows a method 1100 of generating a content stream to control lighting at a user location. The method commences at Start block 1101 and control proceeds to block 1110 for generating illumination data from lighting controls. The lighting controls can originate through manually operated lighting operations, through computer generated controls, or elsewhere. Control then proceeds from block 1110 to block 1120 for providing a content stream of video and illumination data, which are either synchronized or contain information that allows synchronization at a receiver. Other types of data, such as audio or gaming information, can be in the content stream.

Figure 12:
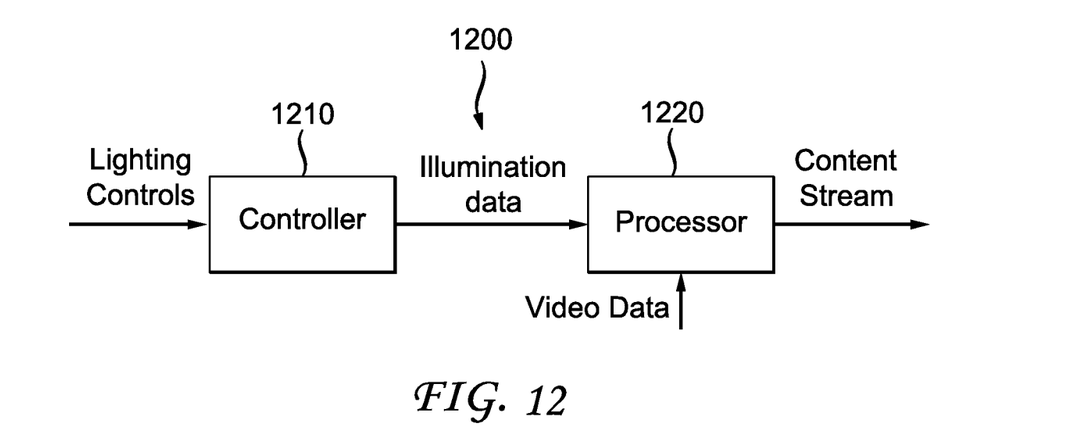
FIG. 12 shows an example embodiment of an apparatus for generating a content stream to control lighting at a user location.

Another embodiment of the described ideas is illustrated in FIG. 12, which shows an apparatus 1200 for generating a content stream to control lighting at a user location. The apparatus comprises Controller 1210 that receives lighting controls on an input port. The lighting controls can originate through manually operated lighting operations, through computer generated controls, or elsewhere. Controller 1210 sends illumination from an output port, which is in signal connectivity with a first input of Processor 1220. Processor 1220 receives video data on a second input port. Processor 1220 then outputs a content stream on an output port comprising the illumination data and video data, which are either synchronized or contain information that allows synchronization at a receiver. Other types of data, such as audio or gaming information, can be in the content stream as well.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for displaying video data at a display location, comprising:
    obtaining a bitstream including video and illumination data, wherein said illumination data comprises luminance and chrominance information associated with said video data and based on a reference lighting setup; and
    controlling lighting at the display location by mapping the illumination data to the lighting at said display location in synchronization with the video data that is output for display, wherein the illumination data are represented by at least one bitstream portion, the at least one bitstream portion includes color information for lighting at the display location, information representative of a duration of the lighting at the display location and information describing a speed to move from one lighting level to another lighting level.

2. The method of claim 1, wherein audio data is included with said illumination data and said video data in a content stream and synchronization is also based on said audio data.

3. The method of claim 2, wherein the audio data is part of a gaming environment.

4. A non-transitory computer-readable medium comprising program code instructions which, when the program is executed by a computer, cause the computer to carry out the method of claim 1.

5. An apparatus for displaying video data at a display location, comprising:
    a receiver of a bitstream of video and illumination data, wherein said illumination data comprises luminance and chrominance information associated with said video data and based on a reference lighting setup; and
    a lighting controller adapted to control lighting at said display location by mapping the illumination data to lighting at said display location in synchronization with the video data that is output for display, wherein the illumination data are represented by at least one bitstream portion, the at least one bitstream portion includes color information for lighting at the display location, information representative of a duration of the lighting at the display location and information describing a speed to move from one lighting level to another lighting level.

6. The apparatus of claim 5, wherein audio data is included with said illumination data and said video data in a content stream and synchronization is also based on said audio data.

7. The apparatus of claim 6, wherein the audio data is part of a gaming environment.

8. A method, comprising:
    generating illumination data comprising luminance and chrominance information from lighting controls based on a reference lighting setup, wherein said illumination data is synchronized to video data; and
    providing a bitstream comprising video data and said illumination data, wherein said illumination data are represented by at least one bitstream portion, the at least one bitstream portion includes color information for lighting at the display location, information representative of a duration of the lighting at the display location and information describing a speed to move from one lighting level to another lighting level.

9. The method of claim 8, wherein other types of data are included in said content stream and synchronization is also based on at least one of the other types of data.

10. The method of claim 9, wherein the other type of data comprises audio information.

11. A non-transitory computer readable medium containing data content generated according to the method of claim 8 for playback using a processor.

12. An apparatus, comprising:
    a controller to generate illumination data comprising luminance and chrominance information from lighting controls based on a reference lighting setup, wherein said illumination data is synchronized to video data;
    a processor adapted to provide a bitstream comprising video data and said illumination data, wherein said illumination data are represented by at least one bitstream portion, the at least one bitstream portion includes color information for lighting at the display location, information representative of a duration of the lighting at the display location and information describing a speed to move from one lighting level to another lighting level.

* * * * *